(12) United States Patent
Schill et al.

(10) Patent No.: US 7,693,922 B2
(45) Date of Patent: Apr. 6, 2010

(54) METHOD FOR PREPROCESSING A SIGNAL AND METHOD FOR SIGNAL PROCESSING

(75) Inventors: Dieter Schill, Winnenden (DE); Jens Wildhagen, Weinstadt (DE)

(73) Assignee: Sony Deutschland GmbH, Cologne (DE)

(*) Notice: Subject to any disclaimer, the term of this patent is extended or adjusted under 35 U.S.C. 154(b) by 1438 days.

(21) Appl. No.: 11/068,286

(22) Filed: Feb. 28, 2005

(65) Prior Publication Data

US 2005/0147181 A1    Jul. 7, 2005

(30) Foreign Application Priority Data

Mar. 1, 2004    (EP) .................................. 04004756

(51) Int. Cl.
*G06F 17/10* (2006.01)
*H04K 1/02* (2006.01)
*H04B 1/04* (2006.01)

(52) U.S. Cl. ..................... 708/300; 375/296; 455/114.3

(58) Field of Classification Search .......... 708/300–400
See application file for complete search history.

(56) References Cited

U.S. PATENT DOCUMENTS

| 4,992,873 | A | * | 2/1991 | Koslov et al. | ............... 348/613 |
| 5,345,406 | A | * | 9/1994 | Williams | .................... 708/300 |
| 6,067,327 | A | * | 5/2000 | Creigh et al. | ............... 375/295 |
| 6,282,247 | B1 | | 8/2001 | Shen | |
| 6,950,975 | B2 | * | 9/2005 | Chang et al. | ................. 714/755 |

* cited by examiner

*Primary Examiner*—Chuong D Ngo
(74) *Attorney, Agent, or Firm*—Oblon, Spivak, McClelland, Maier & Neustadt, L.L.P.

(57) ABSTRACT

A method for preprocessing a signal, wherein an iterative process with at least one iteration is performed to generate an output signal based on an input signal. In each iteration a preceding intermediate output signal and the input signal is received. A process is applied to the preceding intermediate output signal to transform the latter according to a given transfer function so as to generate a transformed preceding intermediate output signal. Then, the input signal is subtracted from the transformed intermediate output signal. Thereby, an intermediate error signal is generated and then added to the intermediate output signal so as to generate a succeeding intermediate output signal which is used as an output signal after the iterative process stopped.

18 Claims, 12 Drawing Sheets

METHOD FOR PREPROCESSING A SIGNAL AND METHOD FOR SIGNAL PROCESSING

FIELD OF THE INVENTION

The present invention relates to a method for preprocessing a signal and additionally to a method for signal processing.

BACKGROUND OF THE INVENTION

In many technical applications signals have to be received, processed and then afterwards transmitted. In addition to the desired steps of processing or transforming the received signal is also subject of undesired processes which can produce unwanted distortions in the signal to be transmitted. These distortions may have linear or non-linear form.

To avoid or reduce these signal distortions in the process of processing or even in the process of transmitting a received input signal as an output signal, different methods of equalizing input signals in advance with respect to the signal distortions to occur have been suggested. A basic principle behind these ideas is to perform a step of preprocessing the received input signal and to add certain characteristics to said input signal which annihilate or compensate the distortions which are added in the main processing step and/or transmission step.

A major drawback of known concepts of equalizing input signals is that in many cases the preprocessing steps are based on an inverse of a transfer function or on an approximation thereof, the transfer function characterizing the respective processing unit. In many cases, the particular structure of the transfer function is not known and/or the respective inverse of said transfer function cannot be established in a simple and reliable manner.

SUMMARY OF THE INVENTION

It is an object of the present invention to provide a method for preprocessing a signal and a method for a signal processing which are capable of realizing an inverse of a given transfer function and a respective process of equalization in a comparable simple and particular reliable manner.

The inventive method for preprocessing a signal, and in particular for preprocessing a broadcasting signal or the like comprises the steps of receiving and/or generating an input signal to be preprocessed, of generating an output signal which is the transformation of said input signal with respect to the inverse of a given transfer function or which is at least an approximation of said transformation, and of outputting said output signal as a preprocessed signal. According to the present invention the step of generating said output signal includes an iterative process with at least one iteration. Said at least one iteration comprises a sequence of different processing steps. First of all, a preceding intermediate output signal and said input signal are received. A process is applied to said preceding intermediate output signal to cause the preceding intermediate output signal to be completely or approximately transformed according to said given transfer function, thereby generating and providing a transformed preceding intermediate output signal. To generate and provide an intermediate error signal said transformed preceding intermediate output signal is subtracted from said input signal. Then, said intermediate error signal or a weighted derivative thereof is added to said intermediate output signal, thereby a succeeding intermediate output signal is generated and provided. In the initial iteration said input signal is used as said preceding intermediate output signal, whereas in non-initial iterations a given succeeding intermediate output signal of the preceding iteration is used as said preceding intermediate output signal for a succeeding iteration. Under a certain stop condition of the iterative process the iteration is stopped with the present succeeding intermediate output signal as the output signal of the method.

It is therefore a basic idea to produce as an output signal an input signal at least approximately transformed by the inverse of a given transfer function by iteratively applying the transfer function itself to the input signal, calculating an error for each iteration with respect to the given input signal and by adding the error in each iteration to each intermediate and transformed output signal. Thereby, an inversely transformed input signal with respect to a given transfer function is formed as an output signal which can be controlled by the error or intermediate error of each iteration step.

The number n of iterations can be controlled by a variety of criteria.

For instance, according to a preferred embodiment of the inventive method the number n of iterations of the iterative process is fixed and/or determined in advance.

Alternatively, the number n of iterations of the iterative process is determined dynamically during said iterative process.

In this case, the number n of iterations of the iterative process can be determined via a stopping condition based on an evaluation of the intermediate error signal and/or its development.

It is preferred that a stopping condition is defined to be fulfilled, if the intermediate error signal is within a predetermined or a given error range.

There is also a variety of possible realizations of the iterative process, of the iterations and/or of the transformation process itself.

According to an advantageous embodiment of the present invention said iterative process, said iterations and/or said transformation process are realized completely or partly by using a digital signal processing means. In such a case, either digital signals have to be processed and/or processes of analog-digital conversion or digital-analog conversion have to be involved.

Additionally or alternatively, said iterative process, said iterations and/or said transformation process itself can be realized in a software implemented form or manner. This yields a particular high flexibility, in particular for adapting the respective transformation process.

Further, said iterative process, said iterations and/or said transformation process may be realized in analog form or manner.

In this case, said'iterative process, said iterations or said transformation process itself may be realized by using analog signal processing means, for instance an analog calculator or the like.

It is of further advantage if the used digital signal processing means and/or the used analog signal processing means are chosen to have or realize said given transfer function or an approximation thereof.

Further, parts of said iterative process, of said iterations and/or of said transformation process may be realized by a feedback process.

Additionally or alternatively, said iterative process, said iterations, said transformation process itself and/or parts thereof may be realized by parallel processing.

As most processing steps occupy a distinct processing time it is of particular advantage when according to a further preferred embodiment of the inventive method during the iteration, said input signal, said preceding intermediate output signal and/or said transformed preceding intermediate output signal are processed to have an essentially fixed temporal relationship with respect to each other, in particular by applying appropriate time delay processes.

It is preferred that said transformation process g is identical an approximation h of said transfer function H or identical to said transfer function H itself.

According to a further aspect of the present invention a method for signal processing is provided.

Known methods for signal processing comprise a step of receiving and/or generating an input signal to be processed by a processing unit as a primary input signal, a step of preprocessing said primary input signal using a process of equalization, thereby generating a primary output signal, a step of using said primary output signal as a secondary input signal for said processing unit, and a step of processing said secondary input signal using said processing unit and thereby generating and outputting a secondary output signal as an output signal of the method for signal processing. It is known to design the process of equalization to give said primary output signal as said secondary input signal certain signal characteristics so as to obtain a secondary output signal with at least partially reduced or compensated distortion effects by said processing unit compared to non-preprocessed secondary input signals.

The method for signal processing is characterized in that a method for preprocessing a signal according to the present invention is involved as said step of preprocessing said primary input signal or as a part thereof and/or as said process of equalization and/or as a part thereof. Further, a transfer function of said processing unit or an approximation thereof are used as said transfer function within said method for preprocessing a signal. A primary input signal or a part thereof is used as said input signal for said method for preprocessing a signal. Additionally, an output signal of said method for preprocessing a signal or a part thereof is used as said primary output signal and/or as said secondary input signal or as a part thereof.

It is therefore a basic idea of the inventive method for signal processing to use the described inventive method for preprocessing a signal to compensate for signal distortions which might occur during the process of the processing unit.

According to an advantageous embodiment of the inventive method for a signal processing, said method for preprocessing a signal and in particular said step of applying the process to the respective input signal or to the preceding intermediate output signal is realized by using said processing unit or a processor which is identical or comparable to said processing unit or a plurality thereof.

According to a further aspect of the present invention an apparatus for signal processing or for signal preprocessing is provided which is capable of performing the inventive method for preprocessing a signal and/or the steps thereof or the inventive method for signal processing or the steps thereof.

Additionally, a computer program product is provided comprising computer product means, which is capable of performing the inventive method for preprocessing a signal and/or the steps thereof or the inventive method for signal processing or the steps thereof when it is executed on a digital signal processing means, a computer, and/or the like.

Finally, according to a further aspect of the present invention a computer readable storage medium is provided, comprising computer program product according to the present invention.

These and further aspects of the present invent will also be described by the following remarks:

Transmitter amplifiers usually have nonlinear transfer function. Therefore, the transmitter is equalized before the transmission of a signal. The invention discloses a very simple iterative approach to equalize a transmitter. The method and algorithm are capable of equalizing linear and nonlinear effects of a transmitter.

An iterative can be approached to linearize nonlinear elements. In a specific example, the iterative approach is used to linearize a DRM transmitter.

A AM/DRM transmitter has a nonlinear transfer function. In the following, the transfer function is called $H(f,t)$, is if frequency and time dependent. Therefore, the nonlinear transfer function needs to be equalized in the transmitter.

In simplified models of known equalization processes, the transfer function $H(f,t)$ combines all linear and nonlinear effects of the amplifier and, e.g. of an antenna. The transfer function depends on the input signal of the transmitter and is therefore time variant. This transfer function H is equalized in the equalizer before the amplifier with the inverse transfer function $H^{-1}(f,t)$. Unfortunately, the inverse transfer function $H^{-1}$ does often not exist. In such a case, the inverse transfer function $H^{-1}$ is approximated with the result of remaining distortions in the transmitted signal.

State of the art transmitter equalizations approximate the inverse transmitter transfer function $H^{-1}$. Such an approximation is very difficult to find and is often far from beeing perfect.

The inventive solution uses a similar iterative approach for the transmitter equalization that can be used for a simulcast signal generation.

For the equalization of the non-linearity, the non-linearity is modeled. The model is used in the iterative approach to generate an output signal. The output signal is compared with a reference signal by means of a subtraction from the delayed reference signal. The delay equalizes the group delay of the non-linearity. The result of the subtraction represents the error signal after the first iteration. The error signal needs to be minimized within the iterative approach to linearize the non-linearity. Therefore, the error signal after the first iteration is multiplied with a weight W and added to the reference signal. The so generated signal is the input signal of the second iteration. The second iteration again uses the non-linear model to calculate the output signal of the real or physical non-linearity, for example, the DRM transmitter. The Input signal to the third iteration is calculated in a similar way from the error signal as described above.

After N iterations, N may be fixed, the error signal is sufficient small. The signal called remaining error can be used for tracking the success of the transmitter equalization. The output signal is directly input to the non-linearity, i.e. In our example the DRM transmitter.

The input and output signal can either be a real or a complex signal. The non-linearity can be any non-linearity, for example a DRM transmitter, an audio amplifier, or an audio speaker.

In case of an audio amplifier, the approach can be used to minimize harmonic distortions in audio power amplifiers, especially for a high output power. The harmonic distortions of audio amplifiers increase with increasing output power, so the distortions can be reduced significantly in case of a high output power. As a result, the output power of the amplifier can be increased.

Of course, a state of the art equalizer can be combined with the iterative approach to improve the performance of a state of the art equalizer.

The approximation of the inverse $H^{-1}$ of a transfer function H of the non-linearity, e.g. amplifier, calculates a pre-equalized output signal. This pre-equalized output signal is input to the iterative approach. The iterative equalizer uses the lower path—the DRM signal—as the reference signal in the iterative approach. The output signal of the approximation of the inverse transfer function is used as the input signal to the iterative approach.

The system has further the advantage, that changes in the non-linearity can easily be tracked by the iterative approach. For example, the temperature drift of the non-linearity can easily modeled in the model used in the iterative approach. In the state of the art method, such a tracking is extremely complicated.

BRIEF DESCRIPTION OF THE DRAWINGS

In the following the invention will be further elucidated by taking reference to the accompanying figures.

In the following, elements with comparable structure and/or functions are denoted with the same reference symbols. A detailed description of these elements is not repeated in each case of their occurrence.

DETAILED DESCRIPTION OF THE INVENTION

Figure 1:
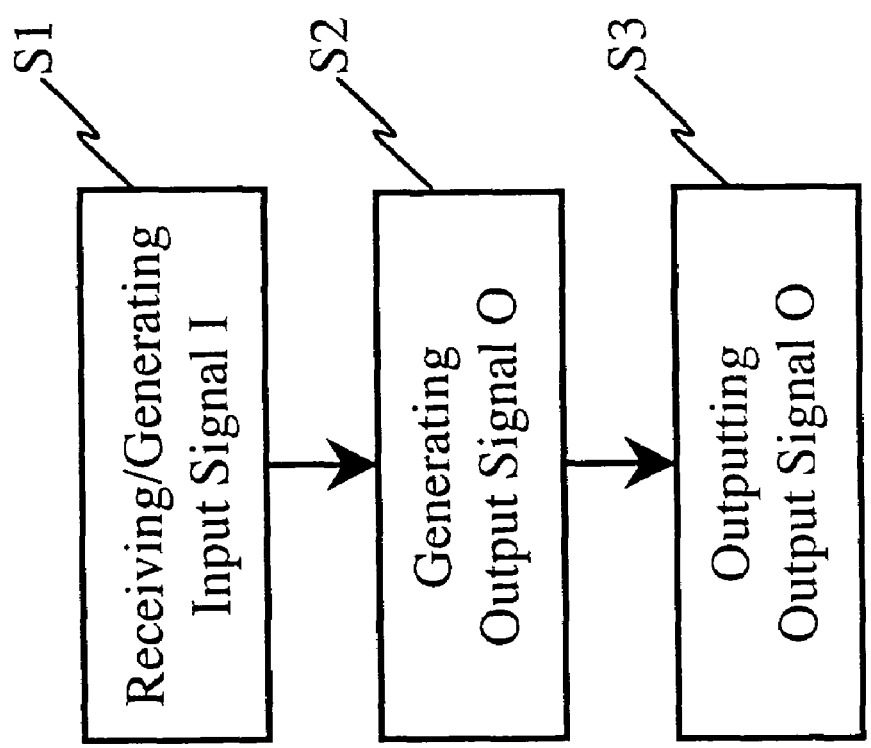
FIG. 1 is a schematical block diagram of a preferred embodiment of the inventive method for preprocessing a signal.

FIG. 1 explains by means of a schematical block diagram the global structure of an embodiment of the inventive method for preprocessing a signal. In step Sl an input signal I is received or generated. In the following step S2 an output signal O is generated based on said received and/or generated input signal I. Finally, in step S3 the output signal O is transmitted or output.

Figure 2:
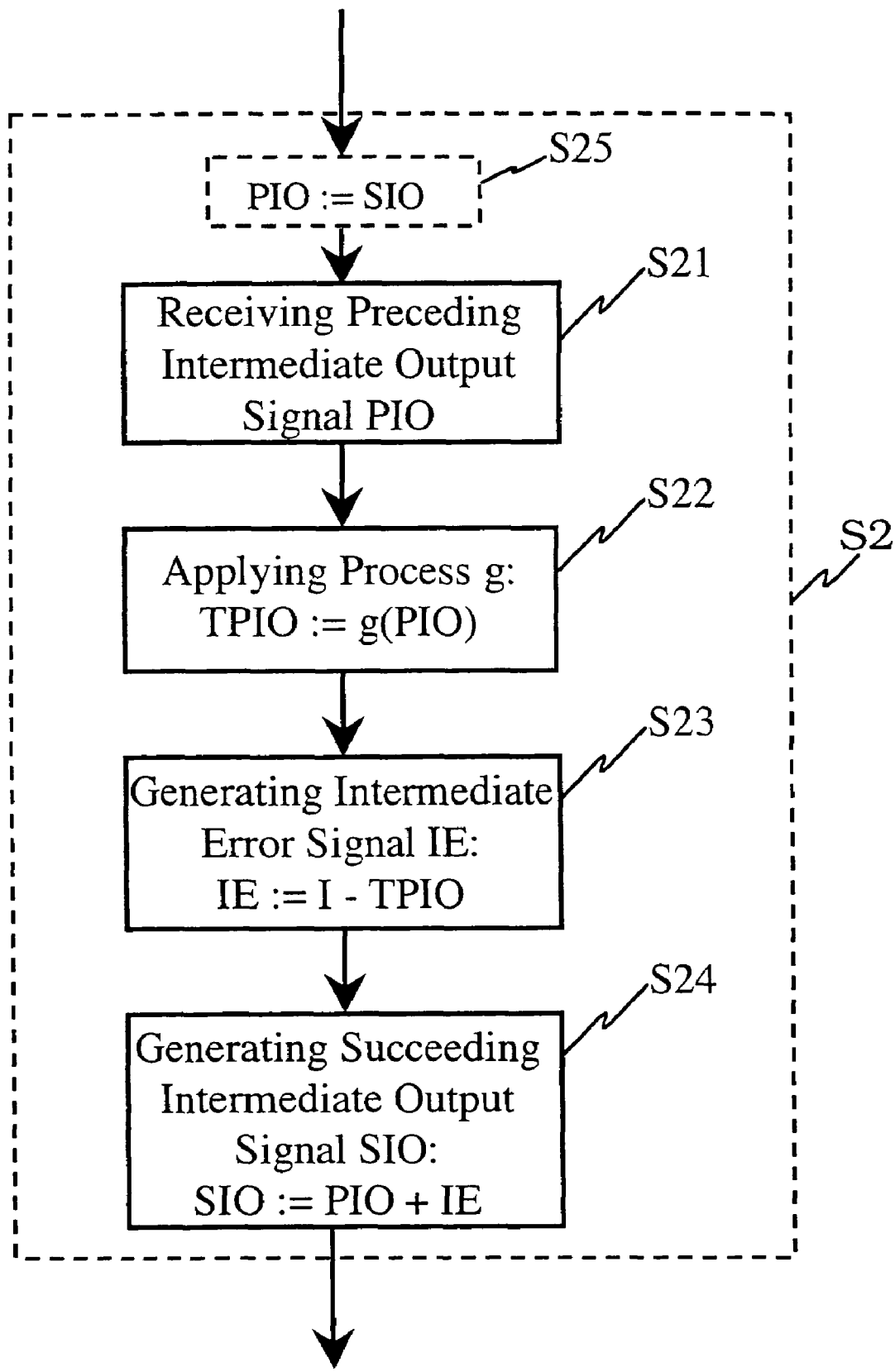
FIG. 2-4 are schematical block diagrams for explaining details of the iteration process.

FIG. 2 shows a more detailed block diagram explaining a possible structure of the step S2 of generating an output signal O according to an embodiment of the method shown in FIG. 1. In step S21 a preceding intermediate output signal PIO is received.

The preceding intermediate output signal PIO for step S2 depends on actual iteration number. If the first iteration is performed said preceding intermediate output signal PIO is just the received input signal I, i.e.: PIO:=I for the first iteration. If however, a further iteration is performed said preceding intermediate output signal PIO has to be the last succeeding intermediate output signal SIO obtained with the last iteration, i.e.: PIO:=SIO for every further iteration.

In the following step S22 a certain process g is applied to the preceding intermediate output signal PIO so as to produce a transformed preceding intermediate output signal TPIO:=g (f,t)*PIO. Here, the term g(f,t)*PIO=$g_{f,t}$*PIO is an approximation of the non-linear transformation function h(f,t)./.H(f, t)=$h_{f,t}$/.$H_{f,t}$ or the term g(f,t)*PIO=$g_{f,t}$*PIO is identical to the non-linear transformation function h(f,t)./.H(f,t)=$h_{f,t}$/.$H_{f,t}$.

Then, by subtracting said transformed preceding intermediate output signal TPIO from the given input signal I an intermediate error signal IE is generated. Said intermediate error signal IE is added to said preceding intermediate output signal PIO so as to generate a succeeding intermediate output signal SIO. Based on an judgment on whether or not a certain stopping condition for the iteration process of the step S2 is fulfilled said succeeding intermediate output signal SIO is used in step S25 as a new value for the preceding intermediate output signal PIO and then supplied again to step S21 of receiving said preceding intermediate output signal PIO. Therefore, the embodiment of FIG. 2 shows a feedback loop structure for the step S2 of generating an output signal O.

Figure 3:
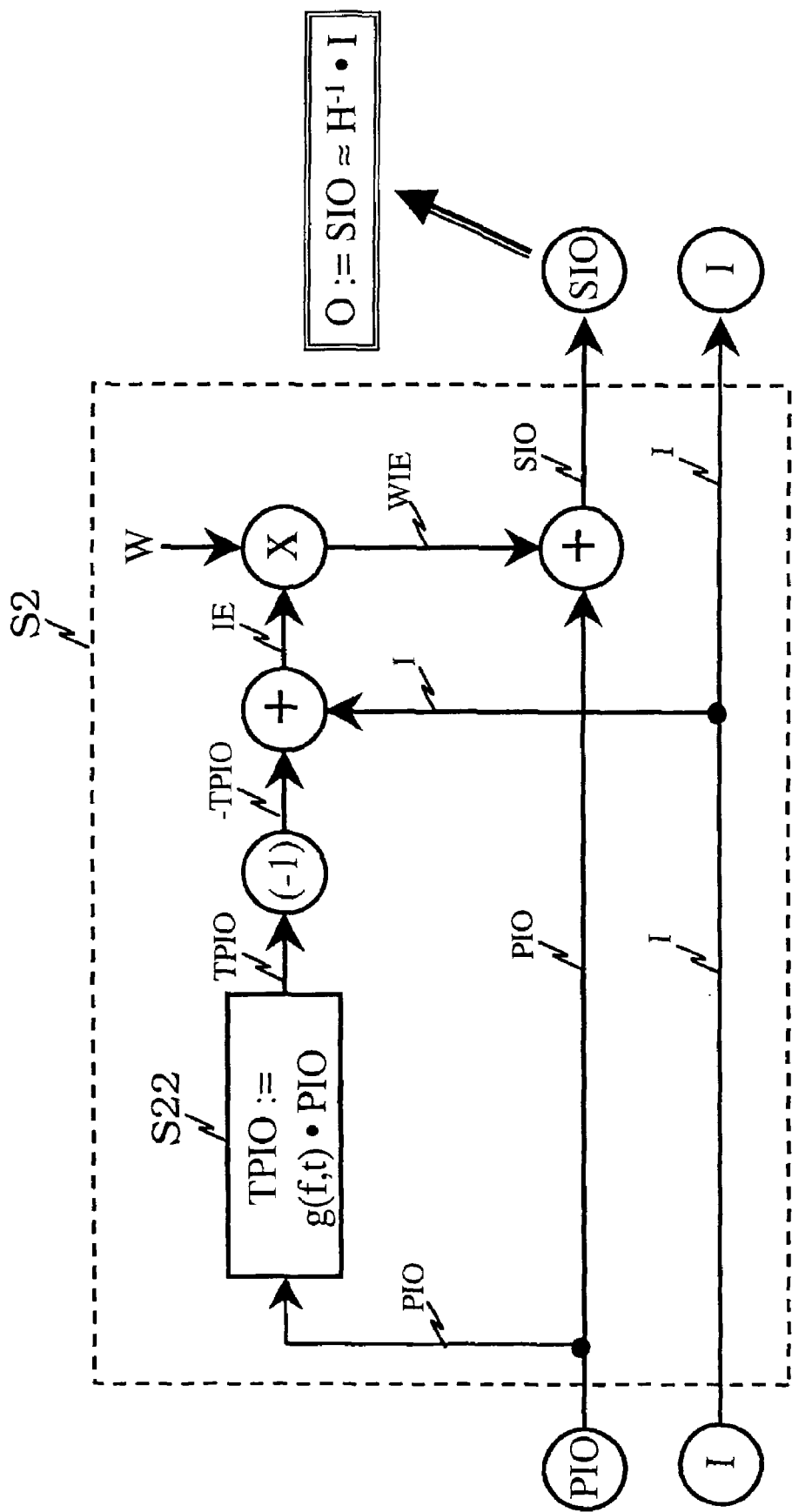

FIG. 3 discloses more details of the process shown in FIG. 2.

The input signal I and the preceding intermediate output signal PIO are supplied to the process S2 of generating an output signal O. In step 322 the certain process g is applied to the preceding intermediate output signal PIO. Thereby, a transformed preceding intermediate output signal TPIO:=g (PIO) is generated. Here, the term g(f,t)*PIO=$g_{f,t}$*PIO is again an approximation of the non-linear transformation function h(f,t)./.H(f,t)=$h_{f,t}$/.$H_{f,t}$ or the term g(f,t)*PIO=$g_{f,t}$*PIO is again identical to the non-linear transformation function h(f,t)./.H(f,t)=$h_{f,t}$/.$H_{f,t}$.

Following the S22 the transformed preceding intermediate output signal TPIO is first inverted and then the input signal I is added, thereby generating an intermediate error signal IE. In the embodiment of FIG. 3 said intermediate error signal IE is subjected to a weighting function W so as to obtain a weighted intermediate error signal WIE. This weighted intermediate error signal WIE is added to said preceding intermediate output signal PIO so as to obtain a succeeding intermediate output signal SIO. In the case that a stopping condition is fulfilled said iterated succeeding intermediate output signal SIO is used as said output signal O of step S2. This output signal O consequently is at least an approximation of the transformation $H^{-1}$.I of the input signal I with respect to the inverse $H^{-1}$ of the given transfer function H.

Figure 4:
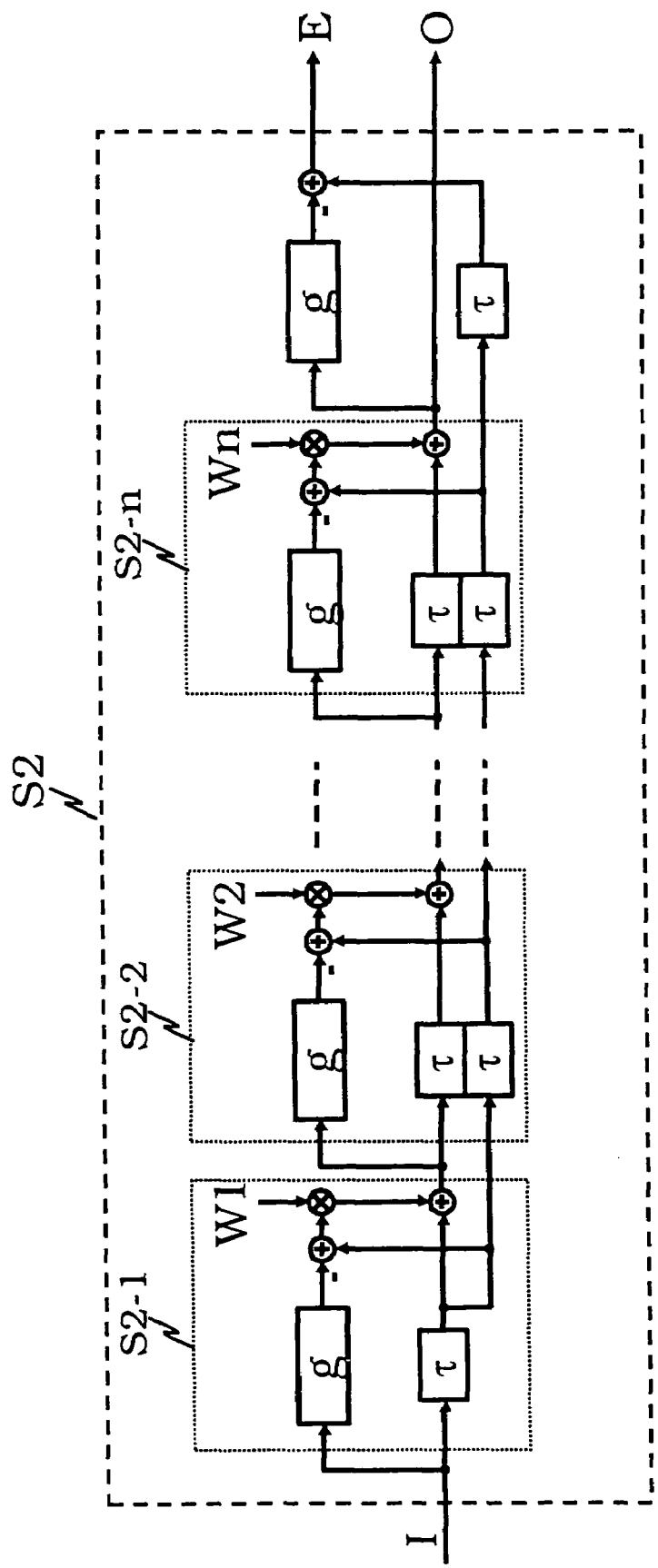

The iteration of the process of FIGS. 2 and 3, i.e. of step S2 for generating an output signal O as shown in FIG. 1 may be realized by a consecutive application of a plurality of processes of FIG. 3 as is shown in FIG. 4. A multiplicity of n sub processes S2-1 to S2-n is concatenated so as to realize the global structure of step S2. Each of the sub processes S2-1 to S2-n has a structure comparable to step S2 shown in FIG. 3. Additionally, the weighting functions W1 to Wn of the sub process S2-1 to S2-n may be different with respect to each other. Further delay components τ are added to temporarily adjust each of the different signals PIO, TPIO and I in each of the iteration steps 1 to n.

In the embodiment of FIG. 4 the input signal I is supplied to the process of step S2 and the output signal O as an approximation of the input signal I transformed by the inverse $H^{-1}$ of the given transfer function H is output. Additionally, a final error E can be supplied and evaluated to characterize the iteration result performed in step S2.

Figure 5:
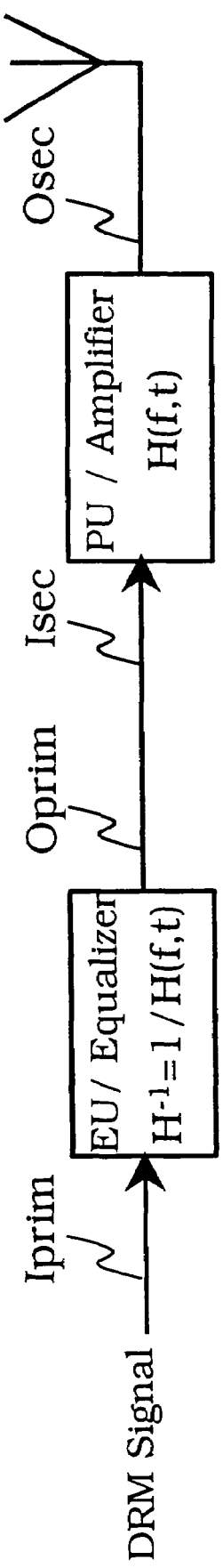
FIG. 5 is a schematical block diagram for explaining a prior art method for signal processing.

FIG. 5 is a block diagram of a known method for signal processing. A primary input signal Iprim, here in the form of a DRM-signal, is fed into a preprocessing block built up by an equalizer as an equalization unit EU which shall realize the inverse $H^{-1}$=1/H(f,t) of the transfer function H. After applying this equalization step a primary output signal Oprim is obtained and used as a secondary input signal Isec for an amplifier and transmitter stage as a processing unit PU having a transfer function H(f,t). Finally, a secondary output signal Osec is provided and transmitted.

Figure 6:
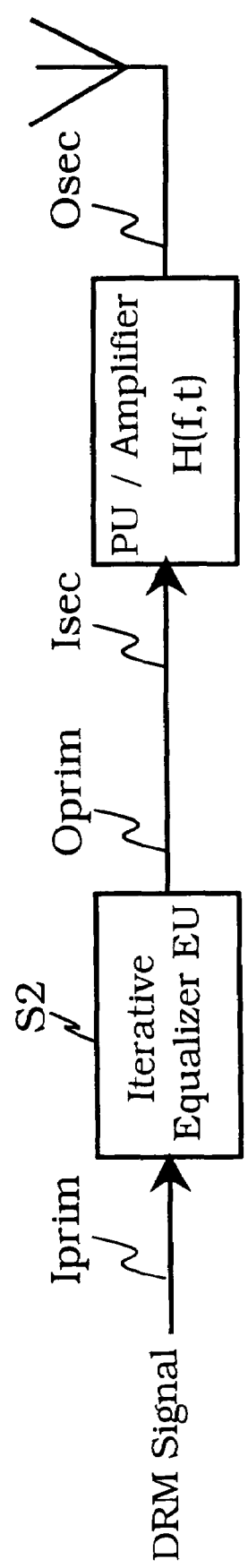
FIG. 6, 7 are schematical block diagrams for explaining embodiments of the inventive method for signal processing.
Figure 7:
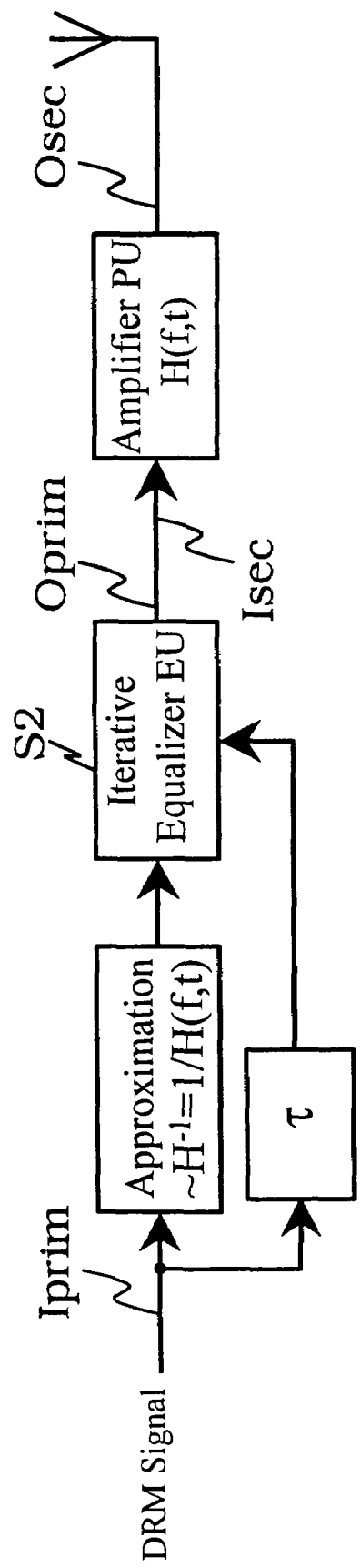

FIGS. 6 and 7 describe by means of schematical block diagrams fundamental structures of embodiments of the inventive method for signal processing.

In contrast to prior art methods for signal processing which try to approximate the inverse $H^{-1}$ of a given transfer function H, the inventive methods for signal processing utilize the inventive method for preprocessing a signal in the context of an iterative equalizer EU as is shown in FIGS. 6 and 7.

In the embodiment of FIG. 6 the iterative equalizer receives a primary input signal Iprim and outputs a primary output signal Oprim which is supplied as a secondary input signal Isec to an amplifier PU having a transfer function H. It is also possible to combine the concept of an iterative equalizer EU with the traditional concept of approximating the inverse $H^{-1}=1/H$ of the prior art as is shown in FIG. 7. Again, here a delay processing τ is also necessary.

FIGS. 8 to 11 demonstrate by means of diagrams the relationship between different signals utilized in the inventive method for preprocessing a signal and for signal processing. In these diagrams, the abscissa shows the frequency difference Δf in kHZ as a variation about a given central frequency which is positioned at the value 0. The ordinate describes the relative and normalized signal strength or amplitude in dB.

Figure 8:
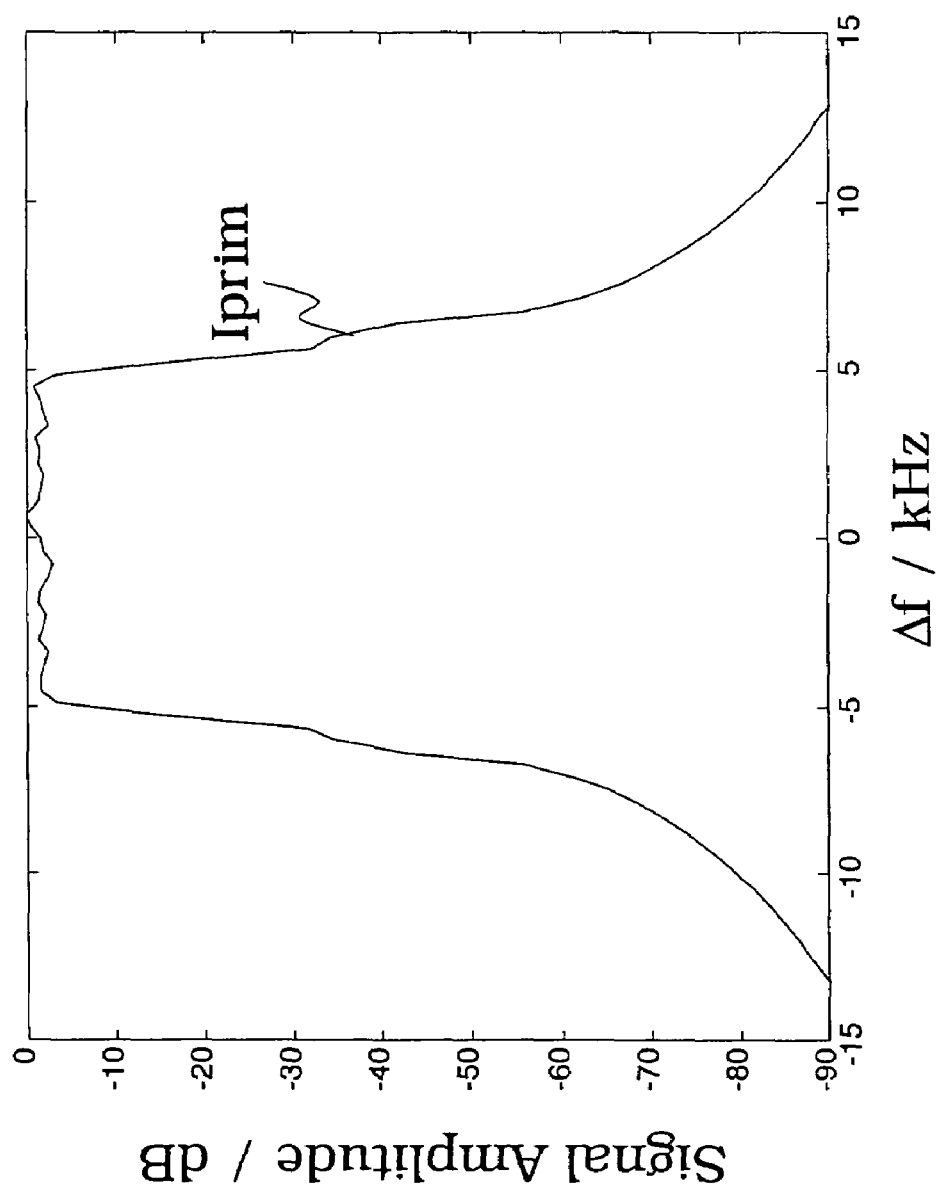
FIG. 8-12 are diagrams which show different signals used in the inventive methods for a signal processing.

FIG. 8 demonstrates the input signal I or primary input signal Iprim used in the embodiments described above.

Figure 9:
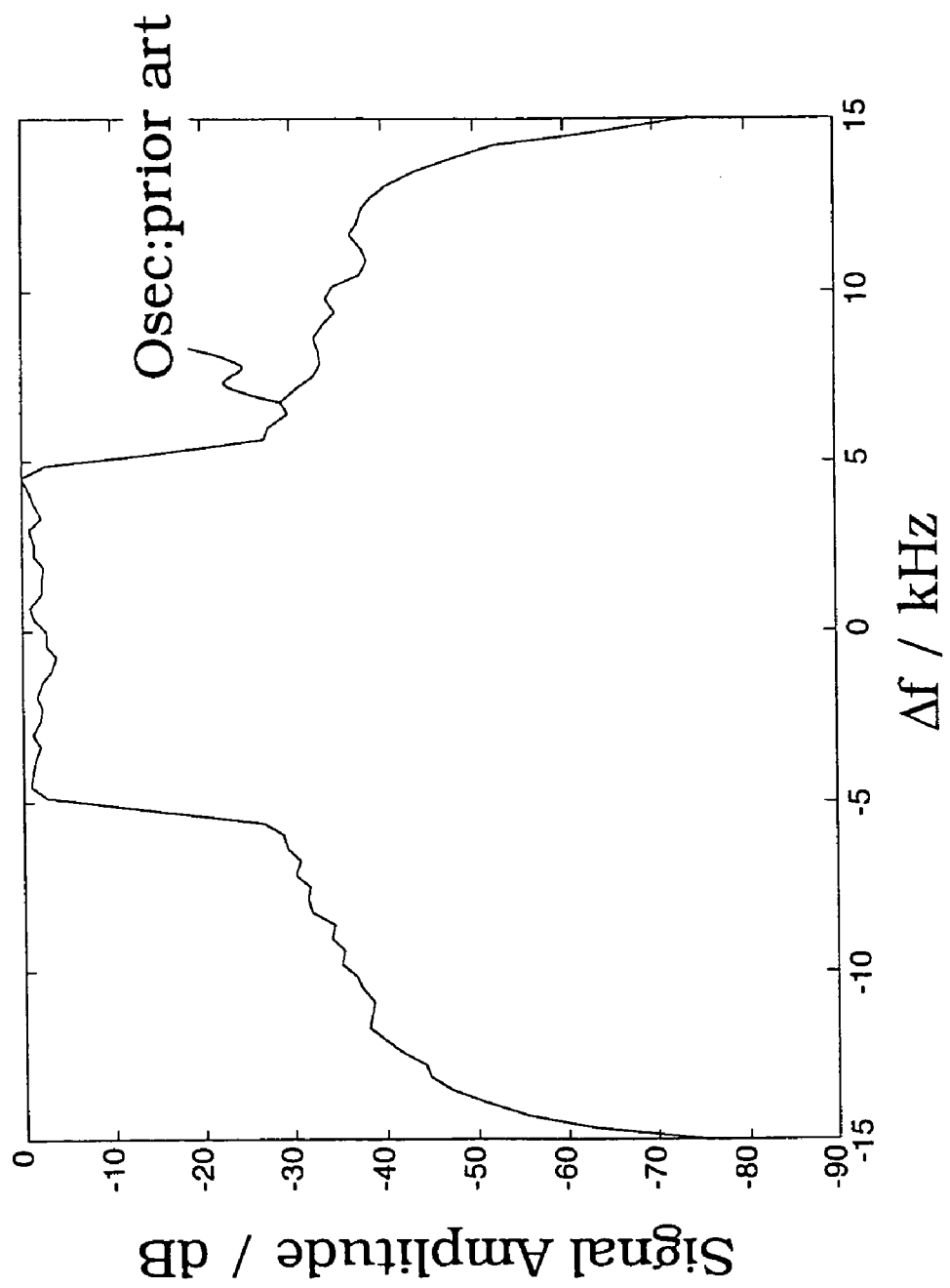

FIG. 9 shows a prior art secondary output signal Osec, i.e. for the case that no equalization or no sufficient equalization has been performed before the transmitting or amplifying process shown in FIG. 5. Signal distortions are demonstrated.

Figure 10:
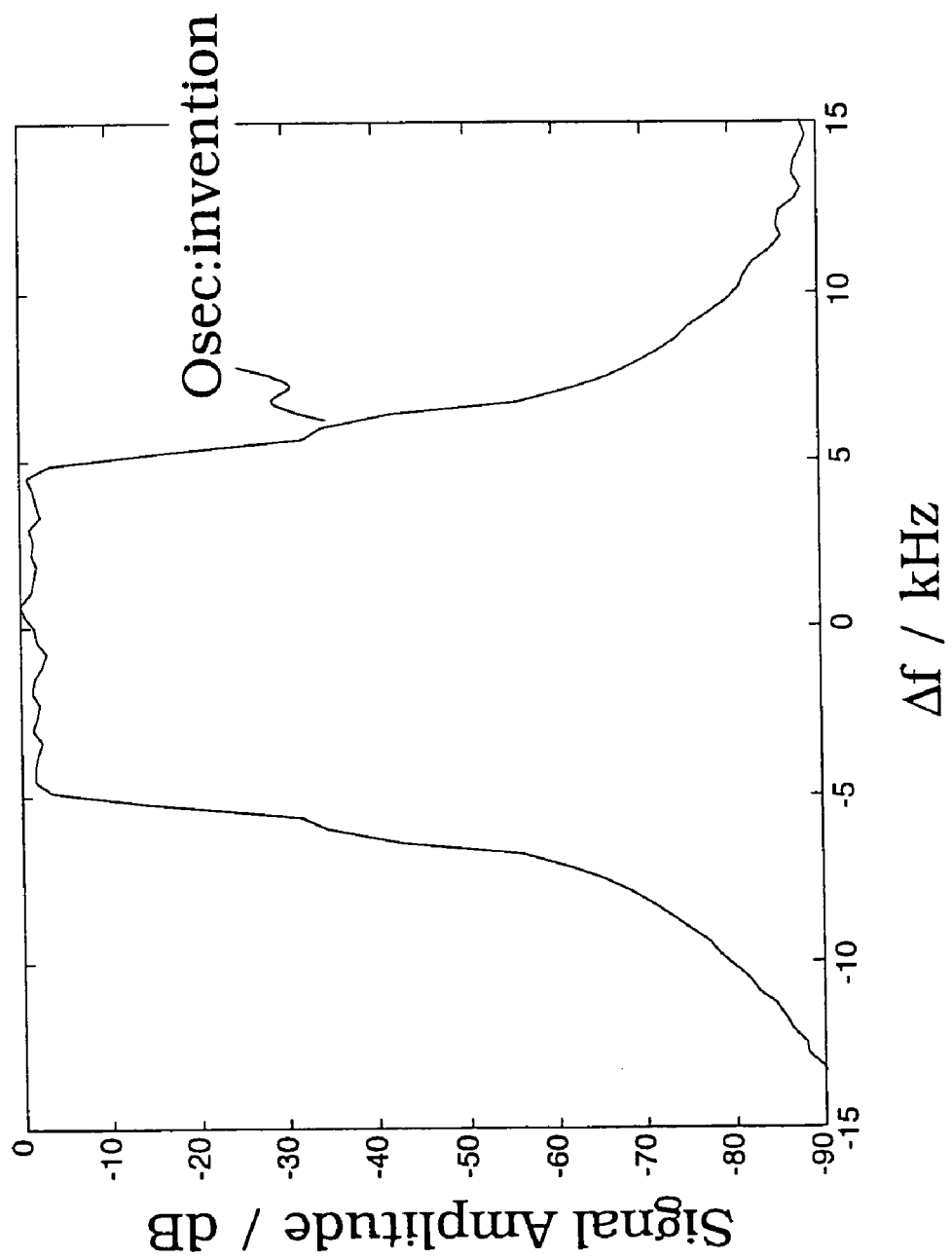

FIG. 10 shows the secondary output signal Osec or output signal O after the combined processes of iterative equalization EU and amplification or transmission PU according to the present invention have been performed. As can be seen from the comparison between the signals shown in FIGS. 8 and 10 the signal characteristics before and after passing through the sections shown in FIGS. 6 and 7 are the same, i.e. there are only negligible signal distortions added to the secondary output signal Osec if a process of iterative equalization EU according to the present invention has been applied before the step of amplification and transmission PU.

Figure 11:
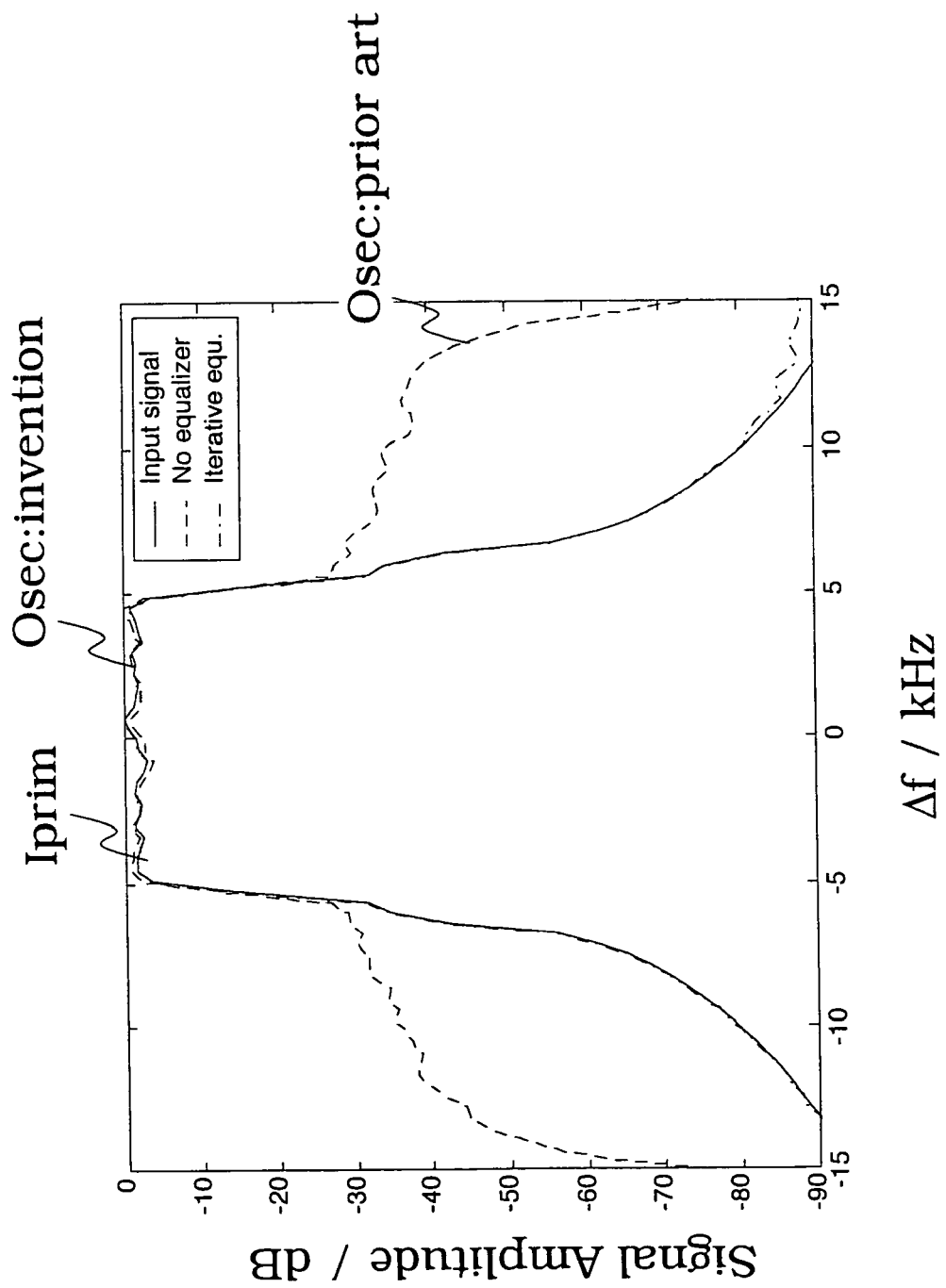

FIG. 11 is a comparison for the signals of FIGS. 8 to 10 to further elucidate the differences and the common features between said signals.

Figure 12:
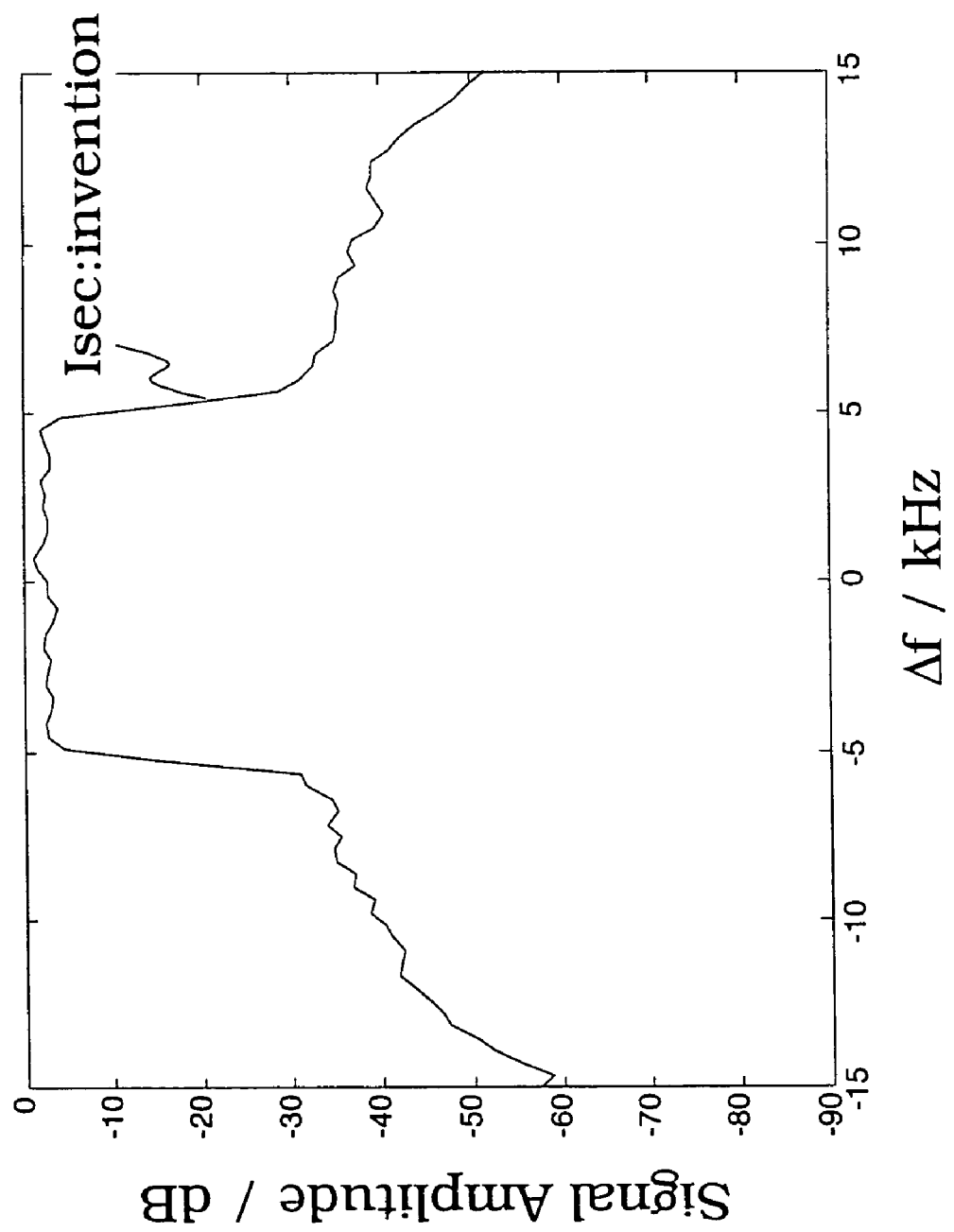

FIG. 12 shows an the primary output signal Oprim which is to be input into the processing unit PU of FIG. 5 as a secondary input signal Isek.

REFERENCE SYMBOLS

E error. final error
EU equalization unit
g transformation process
h approximation of transfer function H
H transfer function
$H^{-1}$ inverse transfer function
I input signal
IE intermediate error
Iprim primary input signal
Isec secondary input signal
O output signal
Oprim primary output signal
Osec secondary output signal
PIO preceding intermediate output signal
PU processing unit
SIO succeeding intermediate output signal
TPIO transformed preceding intermediate output signal
W weighting function
W1, . . . , Wn weighting function
τ delay process
WIE weighted intermediate error

The invention claimed is:

1. A method for preprocessing a signal performed on an apparatus with a processing unit comprising the steps of:

receiving an input signal I at the processing unit of the apparatus, generating an output signal which is a transformation $H^{-1}.I$ of said input signal I with respect to the inverse transfer function $H^{-1}$ of a given transfer function H or an approximation of said transformation, and outputting said output signal as a preprocessed signal from the apparatus, wherein said generating said output signal includes at least one step of iterating, and said iterating comprises the steps of:

receiving a preceding intermediate output signal and said input signal, applying a transformation process to said preceding intermediate output signal which causes the preceding intermediate output signal to be completely or approximately transformed according to said given transfer function H to generate a transformed preceding intermediate output signal, subtracting said transformed intermediate output signal from said input signal I to generate an intermediate error signal, and adding said intermediate error signal or a weighted derivative of the intermediate error signal to said preceding intermediate output signal to generate a succeeding intermediate output signal, wherein in non-initial iterations a succeeding intermediate output signal of a preceding iteration is used as said preceding intermediate output signal for a succeeding iteration, in an initial iteration said input signal I is used as said preceding intermediate output signal, and under a certain stop condition, said iterating is stopped with the present succeeding intermediate output signal as said output signal.

2. The method according to claim 1,
wherein a number n of iterations is fixed.

3. The method according to claim 1, further comprising:
dynamically determining a number n of iterations during said iterating.

4. The method according to claim 3,
wherein in said step of dynamically determining, the number n of iterations is determined via a stopping condition based on an evaluation of the intermediate error signal.

5. The method according claim 1,
wherein a stopping condition is defined to be fulfilled if the intermediate error signal is within a given error range.

6. The method according claim 1,
wherein at least one of said iterating and said transformation process are realized in digital form.

7. The method according to claim 1,
wherein at least one of said iterating and said transformation process are realized using a digital signal processor.

8. The method according to claim 7,
wherein said digital signal processor is configured to realize said transfer function H or an approximation of said transfer function H.

9. The method according to claim 1,
wherein at least one of said iterating and said transformation process are realized in software operable on a processor.

10. The method according to claim 1,
wherein at least one of said iterating and said transformation process are realized in analog form.

11. The method according to claim 1,
wherein at least one of said iterating and said transformation process are realized by using an analog signal processor.

12. The method according to claim 11,
wherein said analog signal processor is configured to realize said transfer function H or an approximation of said transfer function H.

13. The method according to claim 1,
wherein at least one of said iterating and said transformation process are realized by parallel processing.

14. The method according to claim 1,
wherein within said iterating said input signal I, at least one of said preceding intermediate output signal and said transformed preceding intermediate output signal are processed to have a essentially fixed temporal relationship with respect to each other, by applying an appropriate time delay.

15. The method according to claim 1,
wherein within said transformation process uses an approximation of said transfer function H or an identical transfer function H.

16. A method for signal processing performed on a processing unit of an apparatus, comprising the steps of:
receiving an input signal I at the apparatus to be processed by a processing unit as a primary input signal,
preprocessing said primary input signal using a process of equalization,
generating a primary output signal,
using said primary output signal as a secondary input signal for said processing unit, and
processing said secondary input signal using said processing unit,
generating and outputting a secondary output signal from said apparatus as an output signal,
wherein the process of equalization is designed to give said primary output signal as said secondary input signal a signal characteristic so as to obtain a secondary output signal with at least partially reduced or compensated distortion effects by said processing unit compared to non-preprocessed secondary input signals,
and wherein
a method for preprocessing a signal is performed according to claim 1, wherein
a transfer function of said processing unit is used as said transfer function H within said method for preprocessing the signal,
said primary input signal or a part of said primary input signal is used as said input signal for said method for preprocessing the signal, and
an output signal of said method for preprocessing the signal or a part of said output signal is used as at least one of said primary output signal and as said secondary input signal.

17. A computer readable medium having computer instructions recorded thereon, the computer instructions configured to perform a method when said computer instructions are executed on a computer, the method comprising the steps of:
receiving an input signal I;
generating an output signal which is a transformation $H^{-1}.I$ of said input signal I with respect to the inverse transfer function $H^{-1}$ of a given transfer function H or an approximation of said transformation $H^{-1}.I$; and
outputting said output signal as a preprocessed signal,
wherein said generating said output signal includes at least one step of iterating, and said iterating comprises the steps of,
receiving a preceding intermediate output signal and said input signal;
applying a transformation process to said preceding intermediate output signal which causes the preceding intermediate output signal to be completely or approximately transformed according to said given transfer function H to generate a transformed preceding intermediate output signal;
subtracting said transformed intermediate output signal from said input signal I to generate an intermediate error signal; and
adding said intermediate error signal or a weighted derivative of the intermediate error signal to said preceding intermediate output signal to generate a succeeding intermediate output signal,
wherein in non-initial iterations a succeeding intermediate output signal of a preceding iteration is used as said preceding intermediate output signal for a succeeding iteration, in an initial iteration said input signal I is used as said preceding intermediate output signal, and under a certain stop condition of said iterating is stopped with the present succeeding intermediate output signal as said output signal.

18. The computer readable medium according to claim 17, wherein the method further comprises the step of:
dynamically determining a number n of iterations during said iterating, the number n of iterations is determined via a stopping condition based on an evaluation of the intermediate error signal.

* * * * *